May 14, 1957 A. J. GRANBERG 2,792,014
TANK FILLING AND CONTROL SYSTEM
Filed Feb. 24, 1953 10 Sheets-Sheet 1

INVENTOR.
ALBERT J. GRANBERG
BY
Bruce & Brosler
HIS ATTORNEYS

May 14, 1957 A. J. GRANBERG 2,792,014
TANK FILLING AND CONTROL SYSTEM
Filed Feb. 24, 1953 10 Sheets-Sheet 10

INVENTOR.
ALBERT J. GRANBERG
BY
Bruce & Brosler
HIS ATTORNEYS

United States Patent Office 2,792,014
Patented May 14, 1957

2,792,014

TANK FILLING AND CONTROL SYSTEM

Albert J. Granberg, Oakland, Calif.

Application February 24, 1953, Serial No. 338,275

10 Claims. (Cl. 137—267)

My invention relates to tank carrying vehicles and more particularly to means for the filling of tank or tanks on such vehicles, and the dispensing of the contents therefrom. Specifically the invention will be described from the viewpoint of its application to tank trucks.

Currently employed equipment for the filling of tank trucks, such as used to convey and dispense gasoline, oil, and by-product liquids, involves a loading rack with vertical stem pipes and overhead connected swing arms, and an elevated platform for the operators and loaders. The trucks are filled through normally capped openings in the tops of the tanks and this requires facilities as described, to enable the workmen to reach such filling openings. This equipment is not only expensive, but cumbersome and dangerous due to the many contraptions required.

Among the objects of the present invention are:

1. To provide a novel and improved filling system for loading a vehicle mounted tank;
2. To provide a novel and improved system for the filling of tank trucks which shall permit of the elimination of all overhead equipment previously required in the filling of the tanks on such trucks;
3. To provide a novel and improved system for the filling of tank trucks which will utilize the normal discharge lines with which such trucks are conventionally provided;
4. To provide a novel and improved system for the filling of tank trucks wich is semi-automatic in character, and enables selective control of the filling of individual tanks with which such truck may be equipped;
5. To provide a novel and improved system for the filling of tank trucks, which shall be foolproof in its operation;
6. To provide a novel and improved combined filling and dispensing system for tank trucks which is relatively simple and efficient in its operation;
7. To provide a novel and improved tank truck filling system and controls therefor;
8. To provide novel and improved valves and couplings for a tank filling system.

Additional objects of my invention will be brought out in the following description taken in conjunction with the accompanying drawings wherein.

Figure 1:
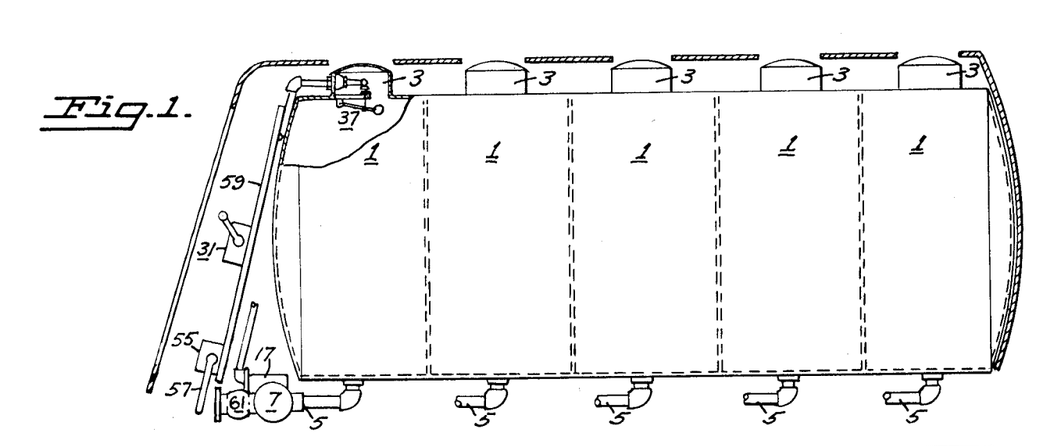
Figure 1 is a side elevational view of the tank section of a tank truck, depicting the relationship of the present invention thereto.
Figure 2:
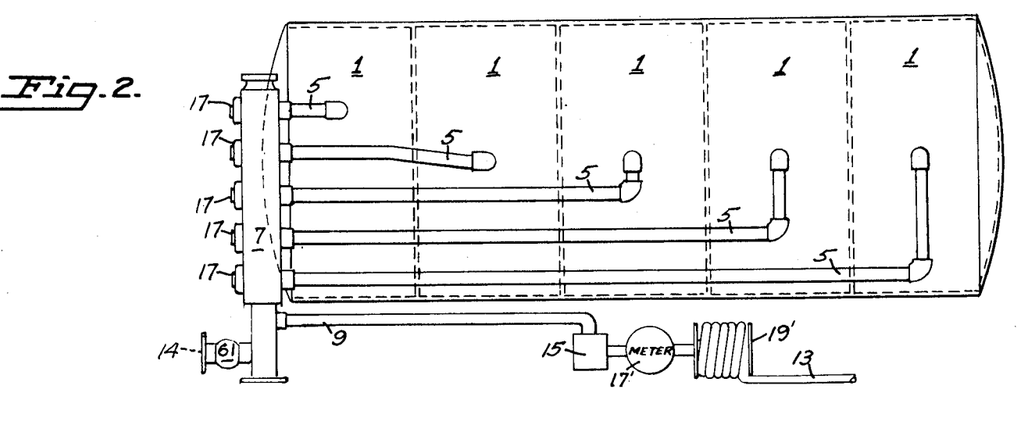
Figure 2 is a view directed toward the bottom of said tank section.
Figure 3:
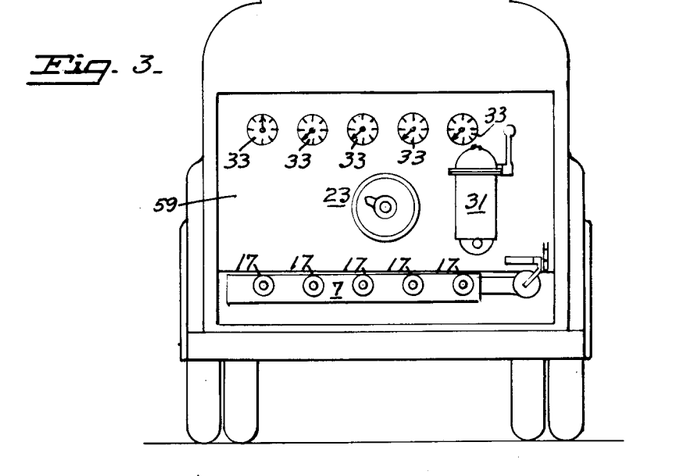
Figure 3 is a rear end view of a tank truck depicting an installation of a control panel forming part of the present invention as applied to a tank truck.

Referring to the drawings for details of my invention in its preferred form, I have illustrated in Figures 1 and 2, the tank portion of a tank truck to which the present invention in particular, relates. Such tank truck is conventionally made up of a plurality of tanks or compartments 1, each provided with a dome 3 through which, in accordance with prior practice, the associated tank or compartment was filled.

From the bottom of each of the tanks, there extends a discharge line 5, with discharge lines terminating in a common manifold 7 from which a common discharge line 9 leads to a discharge hose 13 through an air eliminator 15 and a liquid meter 17'. The discharge hose is usually mounted on a hose reel 19' located at some convenient point on the truck.

The present invention eliminates the necessity of filling such tanks through the domes thereof, by providing means which makes it possible to fill such tanks through the bottoms thereof, preferably utilizing the discharge lines 5 for such purpose. In this connection, it becomes necessary to modify the manifold 7 and employ in conjunction therewith, control system means 11 for enabling an operator to selectively determine the tank or tanks to be filled and at the same time safeguard the operation during the filling cycle, to avoid overfilling of any of the tanks.

In modifying the conventional manifold, it is constructed to include a filling opening 14 aside from a discharge opening, and at each point where a discharge line 5 joins the manifold, a normally-closed fluid-controlled valve assembly 17 is included.

Figure 22:
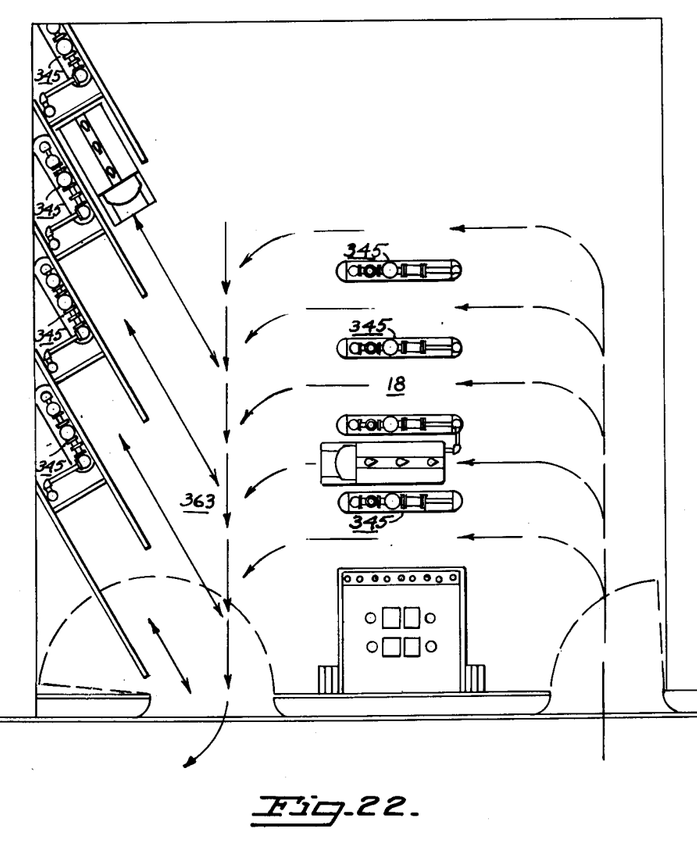
Figure 22 is a diagrammatic view of alternative arrangements for the filling of tank trucks embodying the control panel arrangements of Figure 3.

Each of these valve assemblies is controlled from a source of fluid power, such as compressed air which may be stored in a compressed air tank (not shown) carried by the truck or located at a loading station 18 (Figure 22). A fluid line 19 connectible to such source of fluid power, leads to a plurality of branch lines 21, each of which connects to one of the manifold valve assemblies 17 for opening of the same.

A manually adjustable selector device 23 connected in the system between the fluid line and the branch lines enables an operator to pre-select one or the other of the many tanks mounted on the tank truck, for filling purposes. A power control valve 25 in the fluid line, is provided to enable such operator to control the application of such fluid power to the manifold valve assemblies when desired.

In each of the branch lines, I insert a check valve 26 which will preclude reverse flow in these lines, as well as loss of pressure back through the selector device.

In the system under consideration, the manifold valve assemblies are preferably designed to open under pressure of a low order, such as five pounds per square inch or under. Inasmuch, however, as the fluid power supply is more conveniently developed at higher pressures, it becomes necessary to install in the fluid line, a reducer valve 27 which will drop such pressure down to the operating level of the control system. As a protection against such operating pressure level exceeding the desired operating pressure of the control system, an overload valve 29 is connected to the fluid line and adjusted to open at a pressure slightly in excess of the desired operating pressure.

Should the fluid power supply source fail for any reason or is otherwise not available, an auxiliary source in the form of a manual pump unit 31 may be included as a standby in the control system, to provide the necessary operating pressure during a filling cycle.

By connecting a filling hose 32 to the inlet opening of the manifold, and selectively applying the fluid pressure of the control system to a pre-selected valve assembly or assemblies of the manifold, liquid may be pumped into those tanks corresponding to the manifold valve assemblies thus opened. Discharge of liquid through the discharge opening in the manifold during a filling cycle, is precluded by the normally closed valve in the nozzle of the discharge hose 13.

Associated with each of the manifold valve assemblies, is an indicating meter 33. This meter is fluid-operated and is preferably connected in the system by a line 35 extending from the meter to the branch line connecting to the manifold valve assembly with which the meter is associated, which in effect is the same as connecting the meter directly to the manifold valve assembly. Each meter will therefore respond to the pressure conditions existing at its associated valve assembly, and accordingly, when pressure is applied to a valve assembly to open the same, such pressure will register on the associated meter. On the other hand, when no pressure exists at the valve assembly, the associated meter will register zero pressure.

The control system is arranged to automatically close the valve in a manifold valve assembly when the particular tank which such valve controls has been filled to a predetermined level, which level is reached when the liquid entering such tank rises to a point within the dome at the top thereof. Accordingly, in each of the domes, I provide a normally closed float-controlled valve assembly 37 which is caused to respond to such rise in liquid level and bring about a closing of a valve in the manifold valve assembly which controls such tank.

Such dome valve assembly involves a valve 39 mounted on the wall of the dome and having an inwardly extending control handle 41 terminating in a knob 43. A float arm 45 pivotally connected to the dome wall carries at its other end, a ball float 47, and at an intermediate point of such float arm, a push pin 49 is mounted which extends upwardly through a guide bracket 51 to a point just below the knob on the valve arm. Accordingly, rising liquid in the tank will lift the ball float and cause the push pin to engage the valve operating handle and bring about an opening of the dome valve.

By connecting each such valve to a meter line 35 as by a pipe connection 53, it will become apparent that when such valve is opened, the pressure in the meter line and accordingly the pressure at the associated manifold valve, will drop to essentially a zero value, causing not only the manifold valve to close, thus shutting off further supply of liquid to such tank, but at the same time causing the meter to register zero pressure to thereby indicate that this particular tank is filled.

The various fluid connections to the dome valves are caused to pass through a multiple valve 55 having a manually operable control handle 57 which, in one position, is adapted to open all such connections and in another position, is adapted to close off all such connections. During a discharge cycle all such connections should be closed off regardless of liquid level conditions in the tanks. This latter condition makes the control system available for operating the manifold valves for discharge purposes.

The control system for the most part, is mounted on a panel 59 preferably located at the rear of the tank truck to provide convenient access thereto by an operator. The meters, preferably, are arranged along the upper end in the order of the manifold valve assemblies and the corresponding tanks on the truck, while the selector device and the auxiliary fluid supply source are disposed on the panel within easy reach of the operator.

Figures 16, 20:
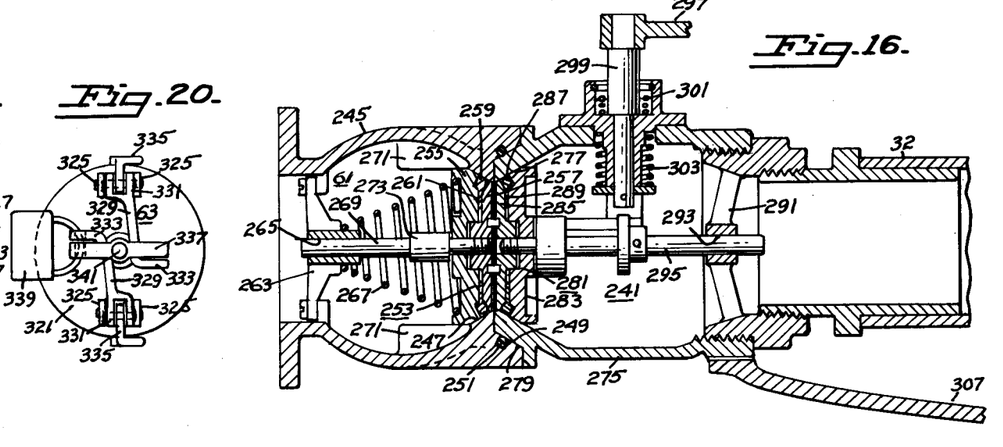
Figure 16 is a view in section of a hose coupling involving a check valve assembly and hose valve assembly.
Figures 19 and 20 are sectional and plan views respectively of a cap for use with the check valve assembly of Figure 16, when the hose valve assembly is disconnected therefrom.
Figure 19:
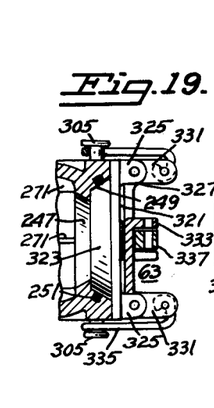

The manifold may be located behind the panel at the lower end thereof, with the valve assemblies protruding through to the front of the panel, or the manifold may be disposed below the panel, in either case, such that the filling opening of the manifold may be within easy reach of a hose line connected to low level equipment of comparable height at a loading station. Such filling opening, in the absence of a hose connection thereto, is normally closed by a check valve assembly 61 (Figure 16) and protected by a suitable closure 63 (Figures 19 and 20).

With the connections to the dome valves closed off, the dome valves become ineffective, and any attempt to fill tanks could result in overflow. Under such conditions, the multiple valve assembly is preferably constructed so that its control handle will occupy a downward position when the valve is closed and a horizontal position when the valve is open, and the assembly is so located on the panel that its handle, when in the down position, will intersect or cross the filling opening to the manifold. In this position, it will prevent the coupling of any hose to the manifold, and in order to conduct a filling operation, the handle must be lifted out of the way to its horizontal position, thereby opening the connections to all the dome valve assemblies.

Figures 5, 6:
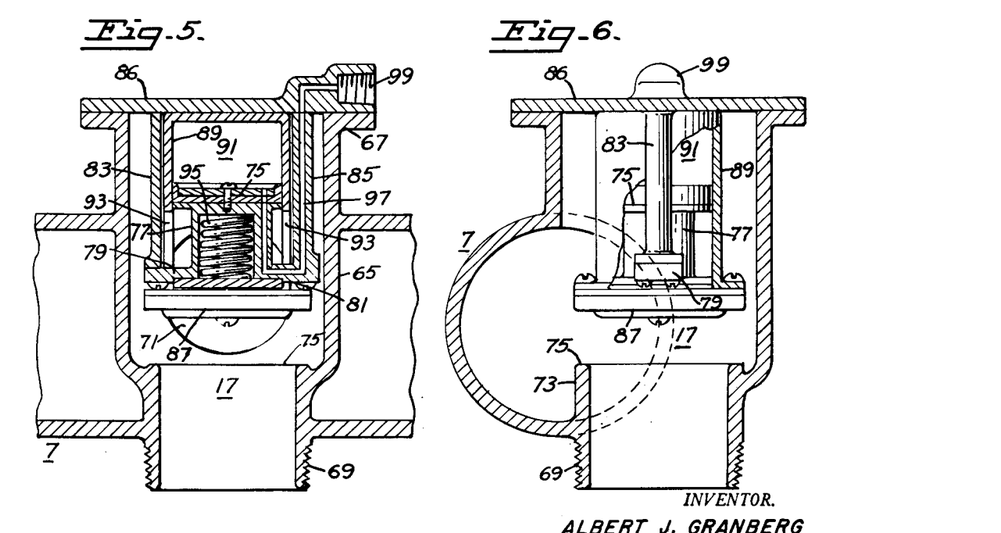
Figure 5 is a longitudinal view in section, through a portion of a manifold in the system of the present invention, depicting the internal construction of each of a series of valves in said manifold.
Figure 6 is a view in section through the valve of Figure 5 taken at right angles to the view of Figure 5.

Each of the manifold valve assemblies comprises a valve housing 65 extending horizontally through the manifold in offset relationship and forming a transverse passage, said housing being flanged at one end 67 and threaded at the other end 69, and having an opening 71 in the wall thereof within the manifold to flow connect the manifold with the housing. Concentric with the threaded end of the housing is an inwardly directed lip 73 to form a valve seat 75.

Within the housing, lies a piston 75 with its longitudinal axis coinciding with the axis of the passage. This piston has a rod 77 extending axially therefrom and terminating in a pair of lateral supporting arms 79, 81. At their extremities, the arms are affixed to a pair of posts 83, 85, extending into the housing from a cover plate 86 bolted to the flanged end of the housing. In this manner, the piston is held against movement and in spaced relationship to the cover plate.

A valve head 87 is supported within the passage in seating relationship to the valve seat, by a closed end cylinder 89 which is slidably mounted over the piston to form a chamber 91, this cylinder having diametrically located slots 93 in the rim thereof to span the piston supporting arms 79, 81 and permit slidability of the cylinder on the piston.

The piston rod is of hollow construction and open at its exposed end to create a chamber for the reception of a compression spring 95 in pressure engagement with the valve head. This spring serves to normally urge the valve head to its seating position on the valve seat. Thus, in the absence of contra-forces, the valve is a normally-closed valve.

The valve is adapted to be opened by admitting fluid such as compressed air or a liquid into the cylinder chamber 91 under sufficient pressure to overcome the seating pressure of the valve spring. By utilizing a relatively light compression spring, the pressure of the operating fluid may be relatively low, in the order of 5 lbs. or under, as previously indicated.

Admittance of such operating fluid to the valve cylinder is provided for by a fluid passage 97 within the piston wall and extending through one of the supporting arms and supporting posts to connect with a pipe fitting 99 on the cover plate.

From the foregoing description of the manifold valve assembly, it will be apparent that the movement of the valve head toward and away from its associated valve seat, is occasioned by movement of the valve cylinder and this in turn is brought about by the cooperative action of the valve spring and operating fluid, depending upon which exerts the greater pressure. Thus for example, when the dome valves are closed, the pressure of the operating fluid will overcome the seating pressure of the valve spring and thus cause unseating of the valve head from its valve seat, but as soon as the pressure of such operating fluid drops to its zero value, as occurs when the associated dome valve opens, the pressure effect of the valve spring will control and force the valve head into seating position against the valve seat, thus closing the valve.

Figures 7, 8, 9, 10:
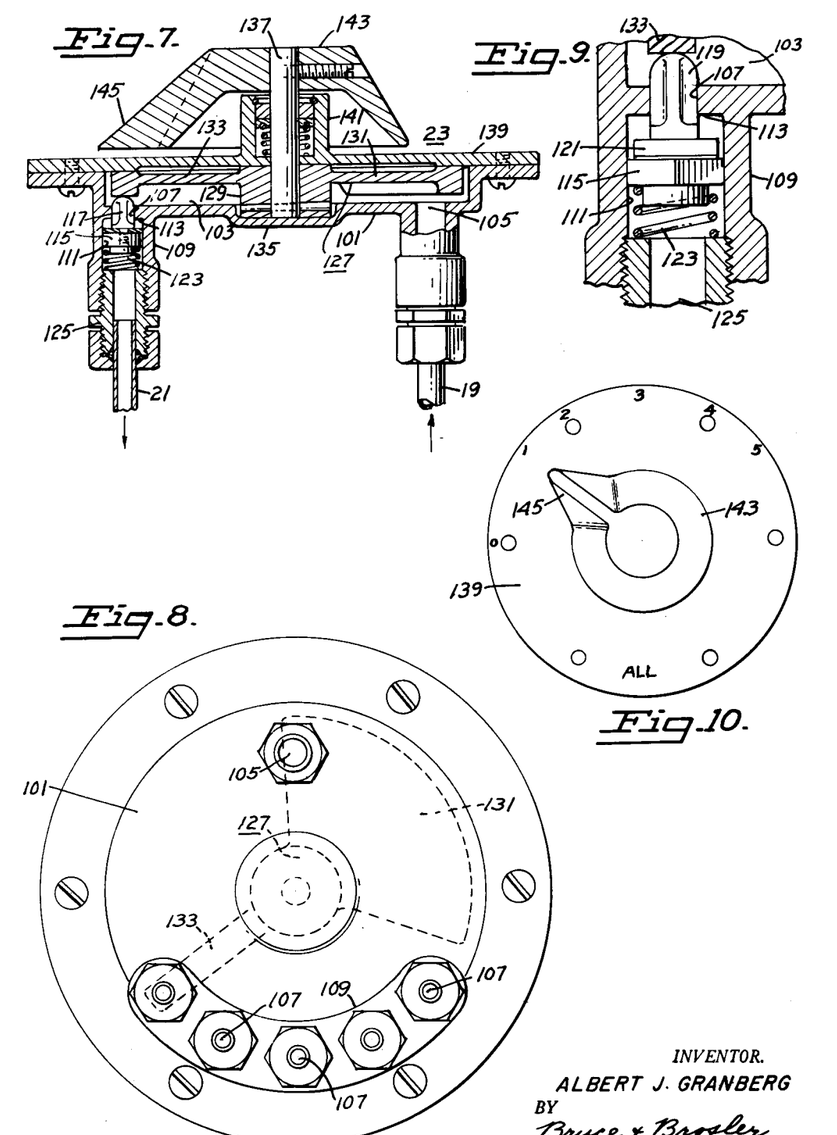
Figure 7 is a view in section through a selector device constituting a component in the control system of Figure 4.
Figure 8 is a view looking toward the bottom of the selector device of Figure 7.
Figure 9 is a view, partly in section, of a valve assembly in the selector device of Figure 7.
Figure 10 is a plan view of a dial employed in the selector device of Figure 7.

The particular flow line selector device 23 employed by me in the control system described above, is one which will enable an operator to fill the tanks individually and in whatever sequence he may desire, or he may fill all of the tanks simultaneously. Such selector device comprises a recessed disk 101 forming a shallow chamber 103, such disk having an opening 105 for the inflow of liquid, and a plurality of openings 107 located along an arc to provide selectable outflow openings.

Valve means are provided to control the flow at each of said outflow openings, such means involving a multiple valve housing 109 depending from the disk and having a plurality of cylindrical passages 111 therethrough, each leading from one of said outlet openings but being of greater diameter to provide a valve seat 113 about each such opening.

In each of said cylindrical passages, is a normally-closed valve assembly including a polygonal shaped body 115 slidably contacting the wall of the passage and having a pin 117 extending centrally therefrom and protruding through the associated outlet opening into the shallow chamber. This pin is formed with a plurality of longitudinal surface channels 119, and surrounding the base thereof in contact with the aforementioned body is a seating washer or disk 121 of a resilient material, adapted in the normal closing of the valve means, to engage the valve seat about the outlet opening and preclude flow of liquid therethrough. Such normal seating of the valve means is occasioned by a valve spring 123 disposed between the valve body and a pipe fitting 125 threaded into the exposed end of such passage. Such pipe fitting serves to anchor one end of a branch line 21 leading to a manifold valve assembly. Normally therefore, the outlet passages, will each be closed off by the associated valve means, and the connected branch line can be exposed to flow of fluid therethrough, only by depressing the valve pin.

To provide for selectively depressing such valve pins, I include a rotor 127 in the shallow chamber, such rotor having a hub 129 and radially extending from the hub is a disk sector 131, spanning an angle sufficient to cover all of the valve pins simultaneously, while from a diametrically opposite location on said hub, there extends radially, a finger 133 adapted to cover but one of said pins at a time.

The hub rests in a centering recess 135 and is of a length to hold the sector and finger in spaced relationship to the bottom of the disk chamber 103 to avoid undue interference with fluid flowing through said chamber. The sector and finger components of the rotor, however, are downwardly flanged to engage and depress the valve pins during adjustable rotation of the rotor.

The rotor is provided with a shaft 137 about which is placed a cover plate 139 to close the shallow chamber. This cover plate preferably includes a suitable stuffing box 141, and on the exposed end of the rotor shaft is affixed a control knob 143 having a suitable indicating pointer 145 preferably integrally formed therewith to designate in conjunction with suitable indicia on the cover plate, the opening position of the selector device for each of the valves included therein.

Figures 11, 13:
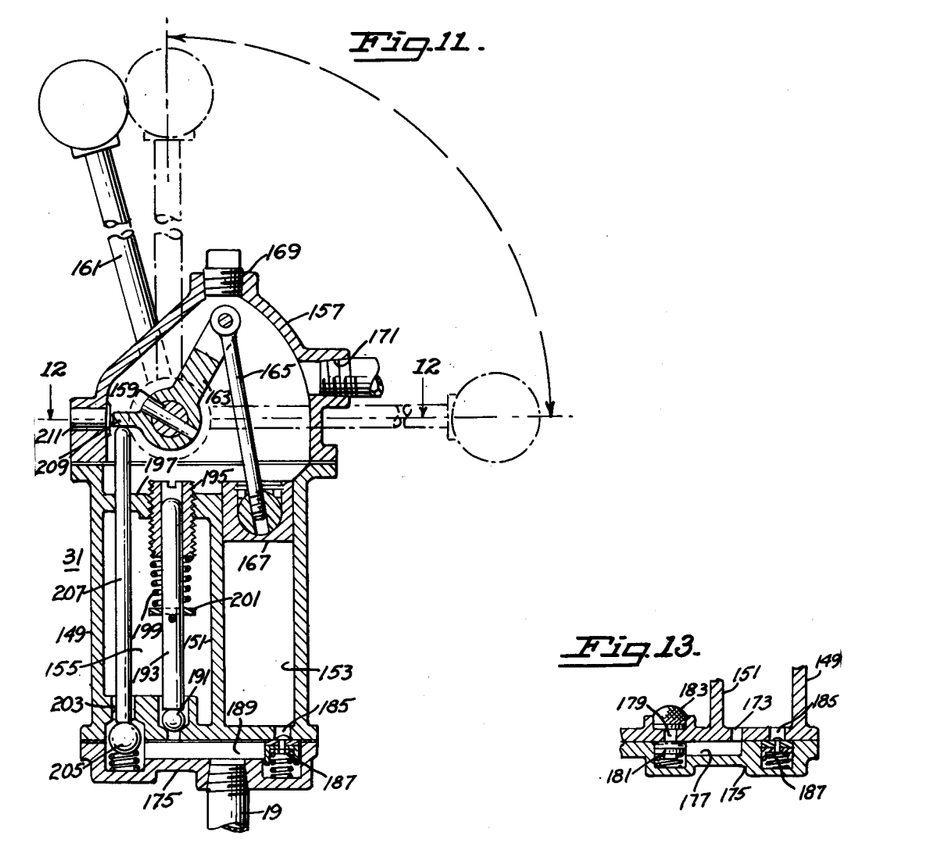
Figure 11 is a view in section of an auxiliary, manually operated, fluid power supply in the control system of Figure 4.
Figure 13 is a fragmentary view, in section, taken through the bottom of the auxiliary power supply of Figure 11.
Figure 12:
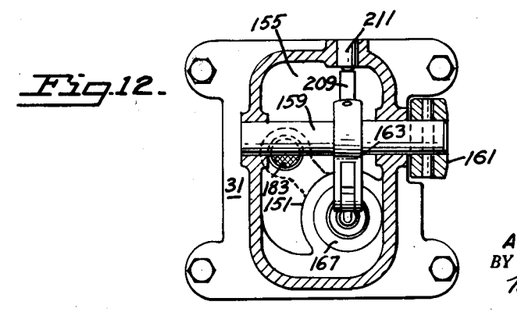
Figure 12 is a view taken in the plane 12—12 of Figure 11.

The manually operable pump unit, which may be relied on as an auxiliary fluid power source, in pumping fluid through the selector device to the manifold valves and other components of the control system involves a casing made up of a main section 149 having an open upper end and a cylindrical partition 151 defining a pump cylinder 153 within such main section, leaving a compartment 155 adjacent such cylinder to function as a reservoir.

The main section is surmounted by a dome 157 through which extends a shaft 159 journaled in the opposite walls of the dome, with one end of such shaft protruding to accommodate an operating handle 161.

Mounted on the shaft within the dome and pinned thereto, is a lever 163, which at its free end, is hingedly connected to the remote end of a piston rod 165. This piston rod, in turn, is pivotally connected to a piston 167 which is reciprocally disposed in the aforementioned cylinder. Angular reciprocation of the handle will accordingly result in reciprocation of the piston in its cylinder.

Initial filling of the reservoir may be effected through a filling opening 169 provided in the upper end of the dome, while return flow of fluid to the reservoir, when the fluid power supply source is connected in a closed system, is by way of a threaded opening 171 in the dome.

On the suction stroke of the piston, fluid from the reservoir will be drawn into the cylinder through a small opening 173 in the floor of the cylinder. Flow connection to the cylinder from the reservoir is provided for by a plate 175 affixed to the lower end of the main section of the casing, and having a channel 177 formed therein and extending from said cylinder opening to an opening 179 in the floor of the reservoir.

This latter opening is normally closed by a spring pressed disk valve 181 disposed in a recess in the end plate, such valve opening in response to the reduced pressure developed in the cylinder during the suction stroke of the piston therein.

On the reservoir side of such valve controlled opening, is a gauze strainer 183 which will serve to separate any foreign matter present in the fluid, before such fluid enters the pump for circulation in the control system.

Discharge from the pump cylinder likewise occurs through an opening 185 in the floor thereof, such opening being normally closed by a spring pressed disk type valve 187 similarly disposed in a recess provided therefor in the end plate.

Fluid discharged from the pump cylinder through this opening finds its way into the fluid supply line 19 of the control system through a channel 189 in the end plate leading to a threaded discharge opening to which the fluid supply line is connected.

The latter channel also extends to an overload ball-type valve 191 in the floor of the reservoir. The ball element of this valve is held under pressure which is adjustable, to permit opening of the valve at a pressure slightly above the operating pressure in the control system. The means for adjusting said pressure involves a pressure rod 193 resting at one end against the ball element, and guided at its upper end in a guide sleeve 195 which is threadedly mounted in a rib 197 extending from the upper end of the cylindrical partition 151 to the wall of the casing. A spring 199 disposed under compression between the lower end of this guide sleeve and a suitable pin or washer 201 mounted on the rod, serves to hold the rod under pressure against the ball element of the overload valve. Pressure of the spring may be suitably adjusted by threading or unthreading the guide sleeve.

Following a pumping operation, any pressure existing on the discharge side of the pump unit may be released by exposing the discharge side to the condition existing in the reservoir 155. This is accomplished by extending the discharge passage 189 to another opening 203 in the floor of the reservoir, and normally closing such opening by a spring pressed ball-type valve 205 below such opening. A push rod 207 normally extending through an opening in the rib 197 as a guide, rests upon the ball in such valve. By the application of pressure to the upper end of this push rod, the normally closed valve associated with such rod may be opened against the pressure of its spring and thereby enable equalization of pressure between the pressure side of the pump unit and the suction side represented by the conditions existing within the reservoir.

Such pressure is applied at the conclusion of a pumping operation by means of a finger 209 extending from the operating shaft and preferably formed integral with the lever mounting, such finger being so located as to depress the rod when the handle is restored to its rest position, which is arbitrarily set at approximately 15 degrees beyond the suction stroke of the handle. Such rest position is mechanically fixed by a spring pressed stop button 211 disposed in the wall of the casing and adapted to engage the extremity of such finger when the operating handle has been restored to that position which determines its rest position.

In the operation of the auxiliary pump unit, it will become apparent that during each suction stroke of the piston, some of the fluid from the reservoir will be withdrawn therefrom into the cylinder and during each compression stroke, the fluid thus withdrawn from the reservoir will be discharged through the control system until the pressure developed reaches that determined by the operating requirements of the various components of such control system. The check valves depicted in the branch lines will tend to hold such pressure until released by opening of the corresponding dome valves.

Figure 14:
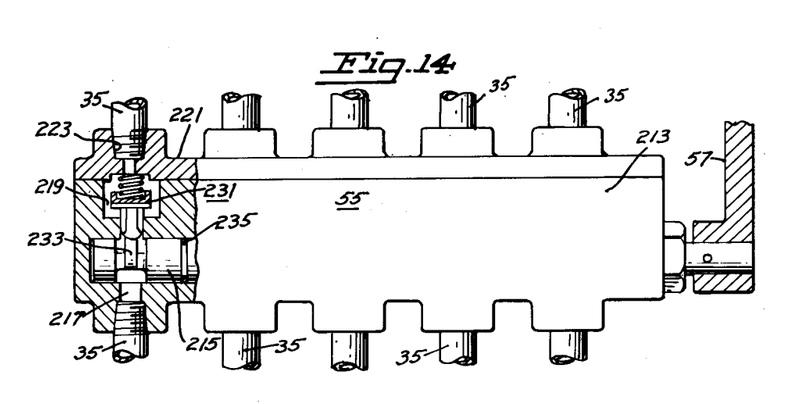
Figure 14 is a view, partly in section, of a multiple valve assembly employed in the control system of Figure 4.
Figure 15:
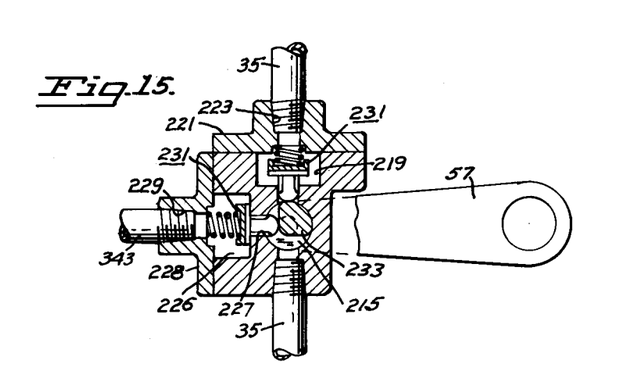
Figure 15 is a view in section transversely of the valve assembly of Figure 14.

The multiple valve 55 involves a casing 213 in the form of an elongated solid body of substantially rectangular section, having a longitudinal bore along an offset axis to receive a suitable cam rotor 215.

Through that side closest to the rotor bore, are a plurality of threaded openings 217 leading to the said bore, and to each of these is connected an incoming section of a line 35.

In the opposite side of said valve casing are a corresponding number of countersunk openings to the rotor bore, to provide a series of valve chambers 219. These are covered by a cap plate 221 having aligned openings 223 which are threaded to receive outgoing sections of lines 35.

Also provided in the valve casing along an intermediate side, is a channel 226 running parallel to the rotor bore and connected by a plurality of passages 227 to the rotor bore corresponding in number and location to the valve chambers 219. The channel is covered by a cap plate 228 having a single threaded opening 229 for a pipe connection.

At each of these valve chambers 219 and passages 227, is a spring biased normally-closed disc-type valve assembly 231 similar to that employed in the selector device, previously described, the valve pins in this instance extending into the bore of the casing. In the absence of any pressure tending to open any of these valve assemblies, all pipe lines leading from the multiple valve will be closed off.

The cam rotor 215 is in the form of a shaft which at spaced intervals corresponding to the location of the passages in the casing, is turned down and shaped to provide at each such location, a cam 233 adapted to ride against the valve pin lying in the plane of such cam, the shape of the cam being such as to occupy a quadrant whereby the same may open the valve in each of the two associated valve assemblies singly or both simultaneously, or permit both to remain closed, depending upon the rotative position of such cam.

To satisfy the requirements of the present system, the horizontal or loading position of the handle 57 exists when the valves in only one series of valve assemblies are opened. The down position, which constitutes the discharge or unloading position, results in all valves remaining closed, while a third or up position of the handle results in all valves being opened simultaneously. This third position precludes any opening of the manifold valves and thus may be availed of for emergency use.

To suitably isolate each section of the multiple valve against leakage of fluid from one section to another, the rotor is grooved at intermediate points to receive O-seal rings 235.

The coupling between the filling hose and the manifold involves the check valve assembly 61 in the filling opening of the manifold and a hose valve assembly 241, together with latching means 243 for releasably locking the one to the other.

The check valve assembly includes a housing 245 having an open end bounded by a tapering valve seat 247 therein, which is concentric and adjacent to an exposed outwardly flaring coupling seat 249. This outwardly flaring coupling seat is formed with a peripheral groove in the surface thereof into which is fitted a sealing ring 251.

Within the valve housing is a valve 253 having a peripheral edge tapered to provide a complementary fit against the valve seat. The valve is formed of an inner disk 255 and an outer disk 257, the adjacent rim corners of these disks being recessed to form a peripheral groove to receive a ring 259 of sealing material. This sealing ring is preferably provided with an inwardly directed fin 261 which is clamped between the inner and outer disks to securely hold the sealing ring in position.

Transversely of the interior of the check valve housing is a spider 263 having a central guide passage 265 therethrough. A coil spring 267 disposed under compression between this spider and the valve, normally urges the valve into seating engagement with the valve seat.

To assure proper guidance of the valve when in operation, the valve is provided with a valve stem 269 which slidably passes through the guide opening in the spider, and in conjunction with this, the valve housing is formed with a plurality of inwardly directed radial vanes 271 terminating in a straight edge along the path of movement of the valve. A stop 273 carried by the valve stem is adapted to strike the spider and thus limit the extent of travel of the valve.

The hose valve assembly which connects at one end to the filling hose, comprises a housing 275 having an internal tapering valve seat 277 concentric with an outer tapering surface 279. The angle of taper of this surface is such as to provide a complementary fit with the outwardly flaring coupling seat 249 of the check valve assembly.

Within the hose valve assembly housing is a valve 281 having a peripheral edge tapered to provide a complementary fit against the internal tapering valve seat, and like the valve of the check valve assembly, is formed of an inner disk 283 and an outer disk 285 with the adjacent rim corners of these disks recessed to provide a peripheral groove for the reception of a sealing ring 287 having an inwardly directed fin 289 which is clamped between the inner and outer disks to retain the sealing ring in its groove.

Also like the check valve assembly, the housing of the hose valve assembly is provided with a spider 291 transversely thereof and having a central guide opening 293 for receiving a valve stem 295 associated with the valve to function as a guide for movements of the valve in said housing.

The hose valve assembly incorporates means for inwardly retracting the valve from its seating engagement with the valve seat, in the form of an operating handle 297 mounted on the end of a stem 299 extending into the valve assembly housing through a suitable gland 301, to operatively engage the valve stem at an intermediate point. A torsion spring 303 disposed about the stem of the handle within the housing, normally acts in the direction of seating the valve, and consequently any turning of the handle to effect an opening of the valve must be in opposition to and of sufficient magnitude to overcome the seating pressure of this spring.

Figure 17:
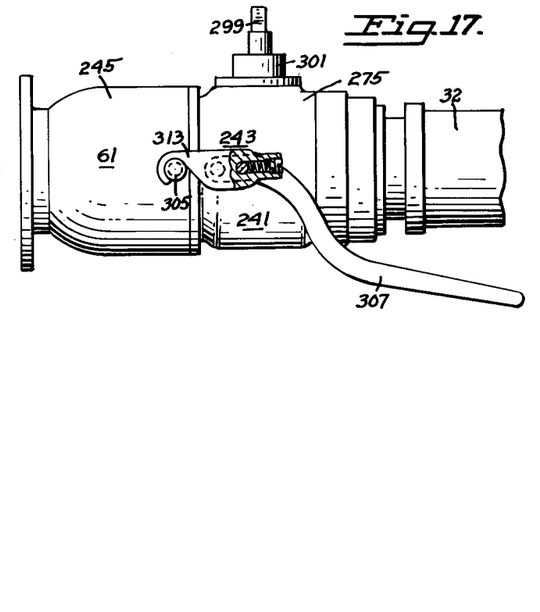
Figures 17 and 18 are plan and elevational views respectively of the hose coupling of Figure 16.
Figure 18:
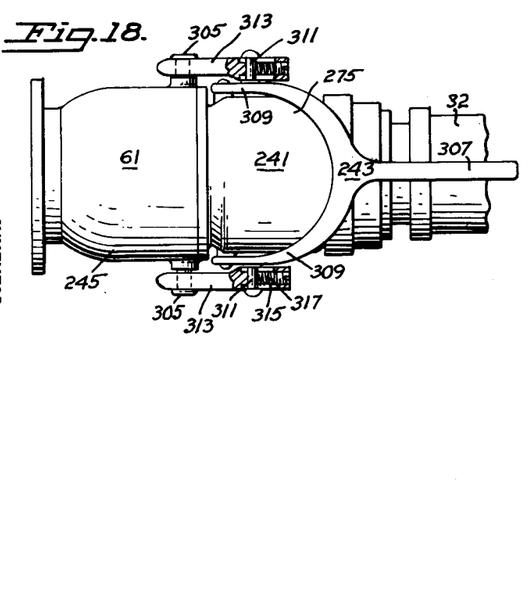

The coupling means 243 for latching the hose valve assembly to the check valve assembly involves a pair of coupling lugs 305 extending laterally from diametrical points on the check valve assembly housing, while in straddling relationship to the hose valve assembly housing, is a coupling fork including the handle 307 and a pair of tines 309, this fork being pivotally anchored to the housing at the extremities of these tines.

Extending laterally from each of said tines at an intermediate point thereon, is a trunnion 311 on which is resiliently mounted a hook 313 for engagement with one of the lugs on the check valve assembly housing, after the check valve assembly and the hose valve assembly are brought together for coupling.

Each of the hooks has a slot 315 through the shank thereof, spaced from the hook end by approximately the distance from the trunnion to the associated lug on the check valve assembly housing, and is resiliently mounted on its trunnion by slipping it over the same and inserting a compression spring 317 in the slot behind the trunnion passing therethrough.

The two assemblies are releasably locked together by swinging the handle forward to enable engagement of the lugs with the hooks, and then retracting the handle to swing the trunnions slightly beyond the dead center position.

An important feature of the check valve assembly and hose valve assembly is the manner in which sealing is effected. By its very construction, compression of the sealing ring in each case, can occur only to a limited degree before metal to metal contact occurs between opposing surfaces. Thus a more stabilized relationship prevails between the surfaces where sealing occurs, than would be the case under conventional practice where the sealing material is usually in the form of a layer intervening between opposing surfaces. Where precision is a factor in the successful and efficient operation of a device, such stabilization becomes of utmost importance, as in the present instance where leakage or dripping of highly inflammable liquid such as gasoline, etc. is to be avoided.

A cap, shown in Figs. 19 and 20, is provided to protect the check valve assembly following uncoupling of the hose therefrom. Such cap involves a disk 321 having a central frusto-conical section 323 adapted to mesh with and seal against the exposed end of the check valve assembly.

At each of diametrically opposite points on the exposed side of the disk, is a pair of perforated spaced lugs 325, between which is pivotally anchored a bell crank lever 327. Such bell crank lever has a long arm 329 and a short arm 331 normal thereto. In one position of the lever, the long arm extends at a slight angle to the diameter of the disk, to a point slightly beyond the center thereof where it terminates in an upturned end 333 at substantially right angles to the arm proper.

The short arm of each bell crank lever has its free end bifurcated to swingably receive the shank end of a hook 335 adapted to engage one of the lugs on the check valve assembly housing when the bell crank lever is rotated out of the position indicated. Upon restoring the bell crank levers to their previous positions, sufficient tension will be developed in the hooks to effect sealing between the cap and the check valve assembly.

To prevent unauthorized tampering with the cap when once applied, suitable locking facilities are provided. A bar 337 rotatably mounted on a central stud 341 in spaced relationship to the disk 321 is adapted to be rotated in a parallel plane adjacent the long arms when in their latching positions, to bring the bar alongside the upturned ends of the long arms. In this position, neither bell crank lever is capable of being manipulated. By providing aligned holes through one end of the bar and the adjacent upturned lever end, a conventional lock 339 may be applied to lock the cap against removal.

Figure 4:
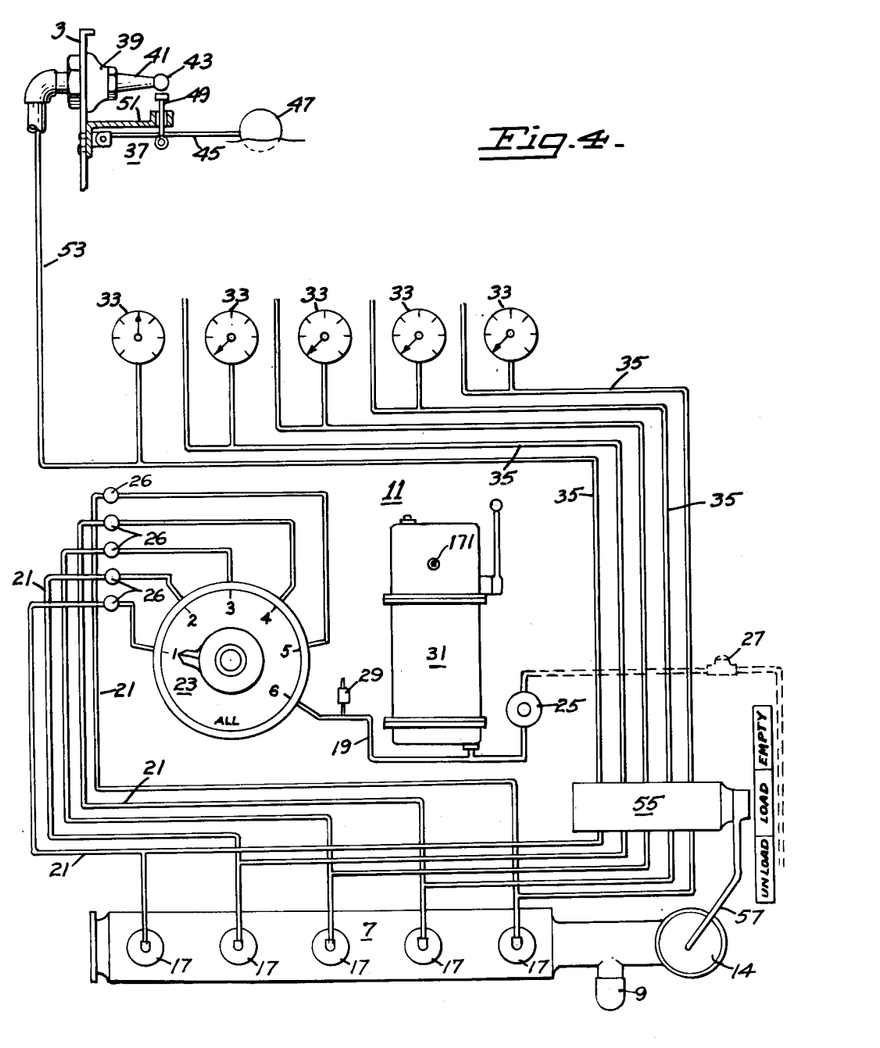
Figure 4 is a schematic diagram of a control system operating from the control panel of Figure 3.
Figure 21:
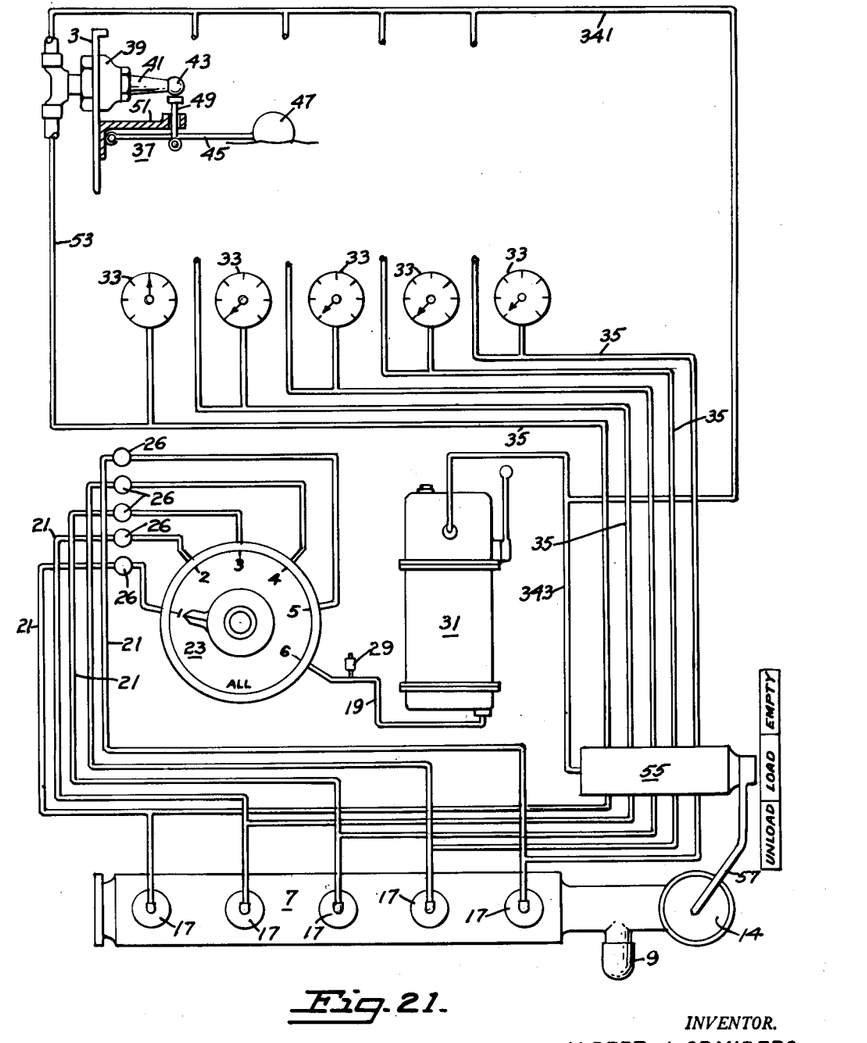
Figure 21 is a schematic diagram of a control system of a slightly modified form from that of Figure 4.

When the fluid utilized in the control system is air under compression, the system may be as depicted in Figure 4 of the drawings wherein the air would be vented to the atmosphere upon opening of any of the float-controlled valves, and likewise at the multiple valve, with the handle moved to the emergency position, air in the lines can be exhausted through the second series of valves described in connection with such multiple valve.

Where the fluid, however, is a liquid, the manually operable pump will preferably be relied on for building up pressure in the fluid. Where such fluid is the same as that being pumped into the tanks, it may be vented into the tanks upon opening of any of the float valves, or a return line 341 might be provided to carry such liquid back to the pump unit to form a closed circuit. If vented to the tanks, the intake to the pump should preferably be connected to the manifold 7.

Likewise, in the emergency adjustment of the multiple valve, the liquid in the control system might be guided back to the pump unit through the aforementioned second series of valves and common return line 343, the channel 226 functioning as a manifold connection to such return line. The float-controlled valves will thus be by-passed and inasmuch as operating pressure cannot be developed in the control system under these conditions, the manifold valves cannot be opened and flow of liquid to and from the tanks becomes impossible.

Obviously, where the control fluid is a liquid different from that being pumped into the tanks, such liquid must be conveyed back to the pump unit.

The above described tank filling and control system makes it feasible to fill tanks from low level equipment at the loading station, wherein the equipment need be no higher than the filling opening in the manifold. Such loading station may include a plurality of islands 345 alongside each of which the tank truck may park for loading purposes.

Figure 23:
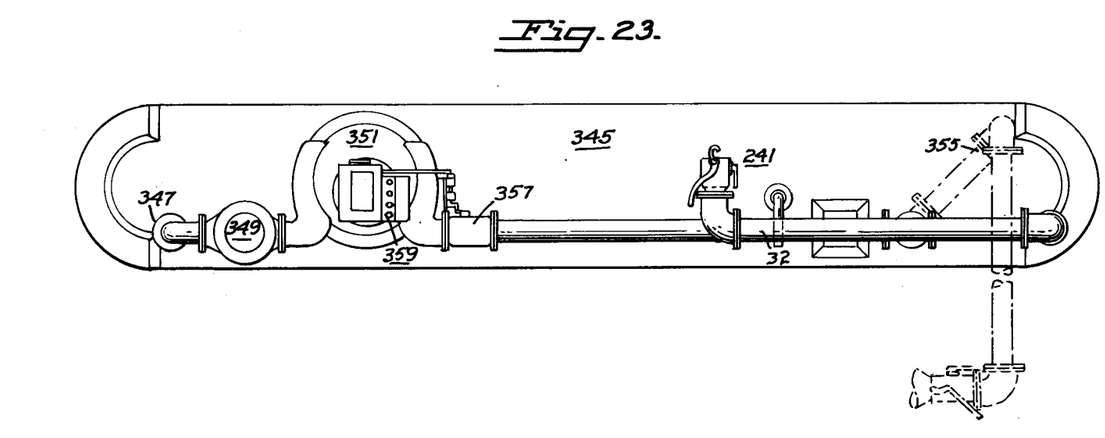
Figures 23 and 24 are plan and elevational views respectively of one of a plurality of similar islands depicted in Figure 22.
Figure 24:
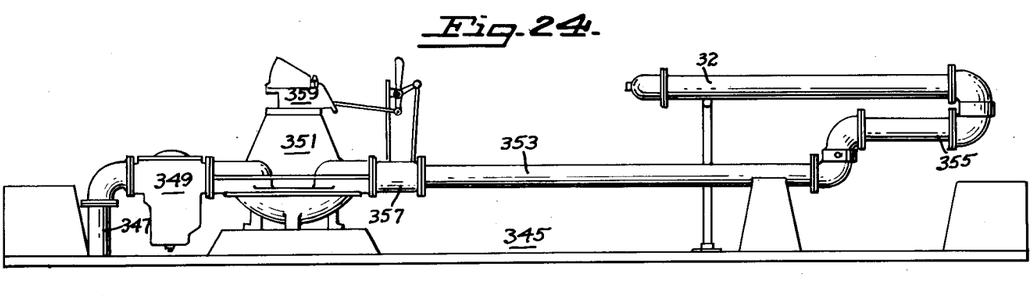

Equipment assembled on such island may involve a pipe line 347 extending upward from some underground tank and connecting with a strainer 349, which in turn connects with a meter 351. From the meter the liquid will be conducted through a pipe 353 and swivel pipe connection 355 to the hose. A slow-closing line valve 357 on the discharge side of the meter may be linked to a precontrol counter 359 on the meter, for automatically closing the supply line when a required amount of liquid has been metered to a tank truck. Such amount will not necessarily coincide with the filling of any particular tank on the truck, and therefore, the precontrol counter does not eliminate the need for the float-controlled valves in the control system on the truck.

A plurality of such islands may be established in parallel spaced relationship to permit movement of tank trucks therebetween for loading purposes, or a number of such islands might be located side-by-side at an angle to a common driveway 363, with sufficient space 365 to permit backing up from such driveway to the loading end of an island.

From the foregoing description of my invention in its preferred form, it will be apparent that the same fulfills all the objects attributed thereto, and while I have disclosed the same in considerable detail and in relation to its application to tank trucks, the embodiment described is subject to alteration and modification and is applicable to other uses such as in the filling of the fuel tanks of aircraft. I, accordingly, do not desire to be limited in my position to the specific details illustrated and described except as may be necessitated by the appended claims.

I claim:

1. In combination, a vehicle having a tank, a filling pipe connecting to said tank at its bottom portion to provide a flow connection thereto, and means for controlling the filling of said tank through said flow connection, said means including a normally-closed fluid-operated valve in said flow connection, a normally-closed float-operated valve in association with said tank and adapted to open when the liquid level in said tank reaches a predetermined maximum liquid level therein, a panel at the rear of said vehicle, means on said panel for applying fluid pressure to said fluid-operated valve to open the same, and means also on said panel, fluid coupling said normally closed float-controlled valve to said fluid-operated valve for relieving said fluid-operated valve of its operating pressure when the liquid level in said tank reaches its predetermined point.

2. In combination, a tank truck having a tank thereon, a common filling and discharge pipe connecting to said tank to provide a flow connection to and from said tank, said flow connection terminating in a filling opening and a discharge opening, and means for controlling the filling of said tank through said flow connection, said means including a normally-closed fluid-operated valve in said flow connection, a panel on said truck, means on said panel for applying fluid pressure to said fluid-operated valve to open the same, and means responsive to a rise in level of liquid in said tank to a predetermined height therein for relieving said fluid-operated valve of its operating pressure.

3. In combination, a tank truck having a plurality of tanks, a manifold supported at the rear of said truck and having a filling opening and a discharge opening, a filling and discharge pipe connecting one of said tanks at its bottom to said manifold to provide a flow connection between said manifold and said tank, a filling and discharge pipe likewise connecting each of said other tanks to said manifold to provide similar flow connections, and means for controlling the filling of said tanks through said manifold, said means including a normally-closed fluid-operated valve in each of said flow connections, a normally-closed float-operated valve in association with each of said tanks, a panel at the rear of said truck, means on said panel for selectively applying fluid pressure to said fluid-operated valves, and means also on said panel, fluid coupling each of said float-controlled valves to its associated fluid-operated valve for relieving such associated valve of its operating pressure when the liquid level in the relevant tank reaches its predetermined point.

4. In combination, a tank truck having a plurality of tanks, a manifold supported on said truck and having a filling opening and a discharge opening, a filling and discharge pipe connecting one of said tanks at its bottom to said manifold to provide a flow connection from said manifold to said tank, a filling and discharge pipe likewise connecting each of said other tanks to said manifold to provide similar flow connections, and means for controlling the filling of said tanks through said manifold, said means including a normally-closed fluid-operated valve in each of said flow connections, a normally-closed float-operated valve in association with each of said tanks, a panel on said truck, means on said panel for selectively applying fluid pressure to said fluid-operated valves, means also on said panel coupling each of said float-controlled valves to its associated fluid-operated valve for relieving such associated valve of its operating pressure when the liquid level in the relevant tank reaches its predetermined point, and means for blocking off said float-controlled valves to permit reopening of said fluid-operated valves for discharge of liquid from said tanks.

5. A filling and discharge control-system for tank trucks or the like having a plurality of tanks, comprising a manifold on such trucks, said manifold having an intake opening and a plurality of pipe connection openings, a pipe leading from each of said pipe connection openings to one of said tanks; a tank filling control system for said tanks including a plurality of normally-closed fluid-operated valves in said manifold, one for each of said pipe connection openings and normally closing the same, a manifold valve opening fluid circuit for actuating said valves to open position, means for preselecting the valves to be opened, and means in response to the filling of a tank to a predetermined level, for shutting the associated manifold valve.

6. A filling and discharge control-system for tank trucks or the like having a plurality of tanks, comprising a manifold on such trucks, said manifold having an intake opening and a plurality of pipe connection openings, a pipe leading from each of said pipe connection openings to one of said tanks; a tank filling control system for said tanks including a plurality of normally-closed fluid-operated valves in said manifold, one for each of said pipe connection openings and normally closing the same, a manifold valve opening fluid circuit involving a source of fluid power for actuating said valves to open position, means individually associated with each of said manifold valves for indicating its open condition, and means in response to the filling of a tank to a predetermined level, for shutting the associated manifold valve and causing the corresponding indicating means to indicate such condition.

7. In combination, a tank truck having a plurality of tanks, a manifold supported on said truck and having a filling opening and a discharge opening, a valve in said filling opening and normally closing the same, a common filling and discharge pipe connecting one of said tanks to said manifold, to provide a flow connection between said manifold and said tank, a common filling and discharge pipe likewise connecting each of said other tanks to said manifold to provide similar flow connections, a normally-closed fluid-operated valve in each of said flow connections, and means responsive to rise of liquid level to a predetermined point in any of said tanks during a filling operation through said manifold for closing its associated fluid-operated valve.

8. In combination, a tank truck having a plurality of tanks, a manifold supported on said truck and having a filling opening and a discharge opening, a check valve in said filling opening and normally closing the same, a common filling and discharge pipe connecting one of said tanks at its bottom to said manifold, to provide a flow connection between said manifold and said tank, a common filling and discharge pipe likewise connecting each of said other tanks to said manifold to provide similar flow connections, a normally-closed fluid-operated valve in each of said flow connections, and means responsive to rise of liquid level to a predetermined point in any of said tanks during a filling operation through said manifold for closing its associated fluid-operated valve, said means including a normally-closed float-controlled valve in association with each of said tanks, and fluid circuit means for connecting a source of fluid pressure to each of said manifold valves and for fluid coupling each of said valves to its associated float-controlled valve to relieve pressure on a manifold valve when such associated float-controlled valve opens.

9. In combination, a tank truck having a plurality of tanks, a manifold supported at the rear of said truck and having a filling opening and a discharge opening, a check valve in said filling opening and normally closing the same, a common filling and discharge pipe connecting one of said tanks at its bottom to said manifold, to provide a flow connection between said manifold and tank, a common filling and discharge pipe likewise connecting each of said other tanks to said manifold to provide similar flow connections, a normally-closed fluid-operated valve in each of said flow connections, and means responsive to rise of liquid level to a predetermined point in any of said tanks during a filling operation through said manifold for closing its associated fluid-operated valve, said means including a normally-closed float-controlled valve in association with each of said tanks, a panel at the rear of said tank truck and fluid circuit means on said panel for connecting a source of fluid pressure to each of said manifold valves and for fluid coupling each of said valves to its associated float-controlled valve to relieve pressure on a manifold valve when such associated float-controlled valve opens.

10. In combination, a tank truck having a plurality of tanks, a manifold supported at the rear of said truck and having a filling opening and a discharge opening, a check valve in said filling opening and normally closing the same, a common filling and discharge pipe connecting one of said tanks at its bottom to said manifold, to provide a flow connection between said manifold and said tank, a common filling and discharge pipe likewise connecting each of said other tanks to said manifold to provide similar flow connections, a normally-closed fluid-operated valve in each of said flow connections, and means responsive to rise of liquid level to a predetermined point in any of said tanks during a filling operation through said manifold for closing its associated fluid-operated valve, said means including a normally-closed float-controlled valve in association with each of said tanks, a panel at the rear of said tank truck, fluid circuit means on said panel for connecting a source of fluid pressure to each of said manifold valves and for fluid coupling each of said valves to its associated float-controlled valve to relieve pressure on a manifold valve when its associated float-controlled valve opens, and means for blocking off said float-controlled valves to permit reopening of said fluid-operated valves for discharge of liquid from said tanks.

References Cited in the file of this patent

UNITED STATES PATENTS

| | | |
|---|---|---|
| Re. 20,863 | Holby | Sept. 20, 1938 |
| 363,884 | Behnke | May 31, 1887 |
| 494,089 | Shurtteff | Mar. 21, 1893 |
| 673,234 | Boothman | Apr. 30, 1901 |
| 1,156,535 | Lewis | Oct. 12, 1915 |
| 1,345,772 | Hibner | July 6, 1920 |
| 1,545,928 | Sayre | July 14, 1925 |
| 1,631,456 | Bardin | June 7, 1927 |
| 2,019,786 | Jurs | Nov. 5, 1935 |
| 2,057,834 | Jurs | Oct. 20, 1936 |
| 2,145,602 | Kirgan | Jan. 3, 1939 |
| 2,228,700 | Hamner | Jan. 14, 1941 |
| 2,240,102 | Textor | Apr. 29, 1941 |
| 2,241,541 | Crangle | May 13, 1941 |
| 2,301,821 | Scott | Nov. 10, 1942 |
| 2,382,562 | Harvey | Aug. 14, 1945 |
| 2,423,879 | Frees | July 15, 1947 |
| 2,543,589 | Newcomb | Feb. 27, 1951 |
| 2,548,354 | Davies | Apr. 10, 1951 |
| 2,625,429 | Coles | Jan. 13, 1953 |
| 2,630,822 | Davies | Mar. 10, 1953 |
| 2,640,497 | Reeve | June 2, 1953 |
| 2,646,072 | Sebald | July 21, 1953 |
| 2,646,817 | Cox | July 28, 1953 |

FOREIGN PATENTS

| | | |
|---|---|---|
| 9,154 | Great Britain | June 22, 1888 |
| 3,930 | Great Britain | of 1913 |
| 299,499 | Great Britain | Oct. 29, 1928 |
| 455,690 | Great Britain | of 1936 |